United States Patent [19]
Mouille

[11] 3,923,419
[45] Dec. 2, 1975

[54] DAMPED ELASTIC TIE DEVICE BETWEEN ROTOR BLADE AND HUB ON ROTARY-WING AIRCRAFT

[76] Inventor: René Louis Mouille, Villa "La Pinede" Le Coton Rouge, Aix-en-Provence(Bouches-du-Rhone, France

[22] Filed: Nov. 6, 1972

[21] Appl. No.: 304,271

Related U.S. Application Data
[63] Continuation of Ser. No. 80,630, Oct. 14, 1970.

[30] Foreign Application Priority Data
Oct. 16, 1969 France .............. 69.35410

[52] U.S. Cl. ............................... 416/107; 416/140
[51] Int. Cl.² ......................................... B64C 27/42
[58] Field of Search .................... 416/106, 107, 140

[56] References Cited
UNITED STATES PATENTS

| | | | |
|---|---|---|---|
| 2,284,717 | 6/1942 | Bennett | 416/107 |
| 2,494,985 | 1/1950 | Campbell | 416/106 |
| 2,616,510 | 11/1952 | Rzeczycki | 416/140 X |
| 2,638,994 | 5/1953 | Buivid | 416/140 |
| 2,815,821 | 12/1957 | Echeverria | 416/106 |
| 2,853,141 | 9/1958 | Leoni | 416/140 |
| 3,160,233 | 12/1964 | Norman et al. | 188/1 |
| 3,301,351 | 1/1967 | Platus et al. | 416/107 X |
| 3,378,083 | 4/1968 | Lichten et al. | 416/140 |
| 3,412,807 | 11/1968 | Kretz | 416/106 X |

Primary Examiner—Everette A. Powell, Jr.
Attorney, Agent, or Firm—Waters, Schwartz & Nissen

[57] ABSTRACT

The technical province of this invention is that of aeronautical engineering, with particular reference to rotary-wing aircraft.

The invention relates to a damped elastic tie device between rotor blade and hub on a rotary-wing aircraft, characterized by the fact that each blade root is provided with hub attachment means having a limited degree of freedom in the plane of rotation of the blades and means which unite the two parts of said attachment means and which associate an elastic element of stiffness proportional to movement to either side of a neutral point with a damping element having a high damping rate.

The applications of the present invention all fall within the province of aeronautics.

5 Claims, 9 Drawing Figures

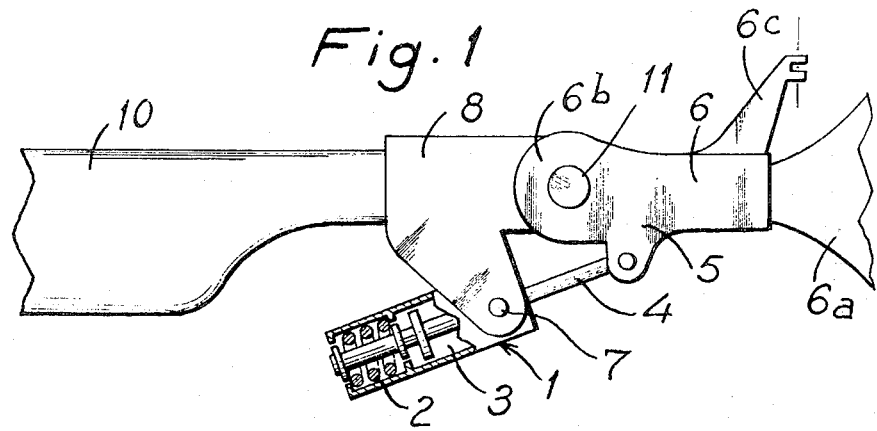
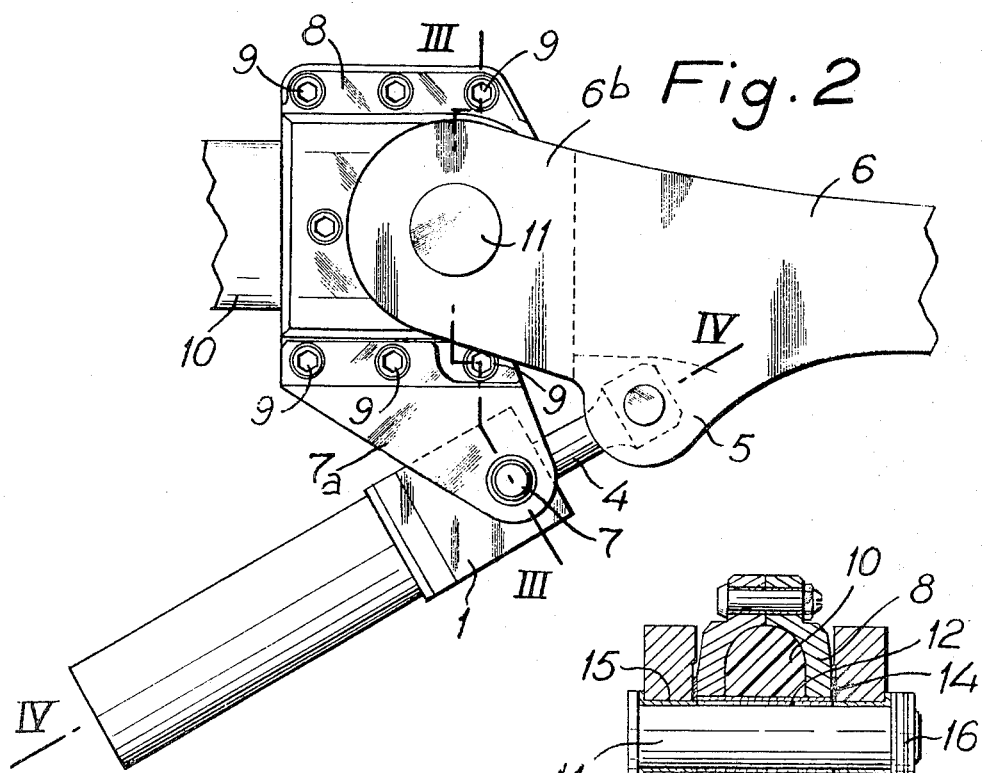
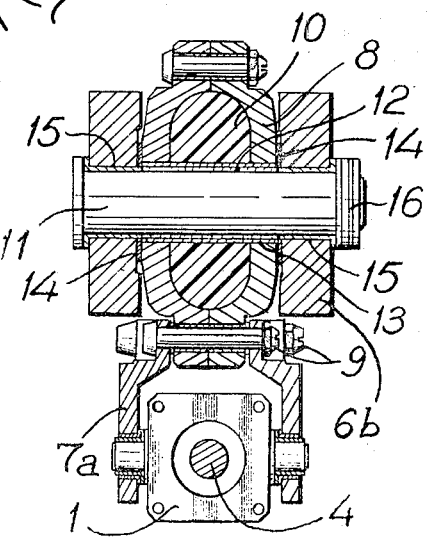

DAMPED ELASTIC TIE DEVICE BETWEEN ROTOR BLADE AND HUB ON ROTARY-WING AIRCRAFT

This application is a continuation of application Ser. No. 80,630 filed Oct. 14, 1970.

The technical province of the present invention is that of aeronautical engineering, with particular reference to rotorcraft and helicopters. Already known are vehicles of this kind in which a lift rotor includes a hub partly or wholly devoid of hinges operating in the plane of rotation of the blades (known as drag hinges) or in the plane perpendicular to that plane (known as flapping hinges), the aim being to simplify the design and reduce production and maintenance costs of the hub, and furthermore to be able to dispense with landing-gear shock-absorbers by obviating ground resonance.

One solution proposed consists in providing such rotors with blades endowed with sufficient flexibility at their roots and along their running sections to permit satisfactory operation of the rotor as a result of their own deformations, such blades being for example made of glass fibres impregnated with a synthetic resin.

Such blades have their dynamic characteristics chosen so that their natural vibration frequencies are correctly situated in relation to the nominal rotor rotation speed and to multiples thereof, the first mode in the plane of the rotor being situated for example in the region of three-quarters of said nominal speed.

However, by reason, on the one hand, of the more or less large range of permissible in-flight variations in rotor speed and, on the other hand, of the transitions through resonance frequencies below the nominal rotation speed when speeding up or stopping the rotor, or when completing a landing with the rotor windmilling, it may be necessary to substantially modify the natural frequency of a blade-hub assembly and in particular to reduce the frequency of the first vibration mode of the blades in drag and at the same time to increase the degree of damping of said frequency in order to cover all possible contingencies with a suitable safety margin and avoid damage to the blades and hub through the development of excessive stresses resulting from operation in the region of critical rotor speeds.

The object of the present invention is to achieve such frequency modifications together with increased damping without detriment to the original simplicity of design of the hub and without the need for landing-gear shock-absorbers.

The invention accordingly relates to a damped elastic tie device between blade and hub of a rotorcraft rotor, characterized by the fact that each blade root is provided with hub attachment means endowed with a degree of freedom in the plane of rotation of the blades and means for uniting the two parts of said attachment means, to wit the blade root and the hub portion supporting said attachment means, said uniting means associating an elastic element having a degree of stiffness proportional to the extent of movement about a neutral point and a damping element having a high damping rate.

According to one specific embodiment of the invention, the damped elastic tie device includes a metal coil spring or preferably a stack of dished spring washers having a stiffness of several hundred decanewtons per millimetre of movement, and these washers are rigidly united in series either with a hydraulic damper (of the piston type, say, in which oil is throttled between the piston and the cylinder) or with a damper which operates by shearing interposed blades made of plastics, a material possessing retentivity under distorsion in a high degree, thereby generating a damping effect.

In an alternative form of embodiment, the tie member comprises a short-travel sliding system consisting either of coaxial tubes or of parallel strips, which tube or strips have interposed therebetween a viscoelastic substance in strip form which provides at once a degree of elasticity for imparting the desired springiness and a high degree of retentivity under distortion in order to provide dynamic damping of the motions in which said tie member partakes.

In still another embodiment, the tie member includes one or more rollers or rings made of said viscoelastic material and interposed between plates which are angularly rigid with the blade attachment means on the blade and the hub respectively.

The applications of the present invention and the possibilities of exploiting it industrially all fall within the realm of aeronautics and aerodynamics.

The description which follows with reference to the accompanying non-limitative exemplary drawings will give a clear understanding of how the invention can be carried into practice. In the drawings:

FIG. 1 is a schematic plan view of the method of attaching a helicopter rotor blade to a hub member, the attachment means embodying a frequency adapter with integral damping;

FIG. 2 shows on an enlarged scale a detail of FIG. 1;

FIG. 3 is a section taken on the line III—III of FIG. 2;

Figure 4:
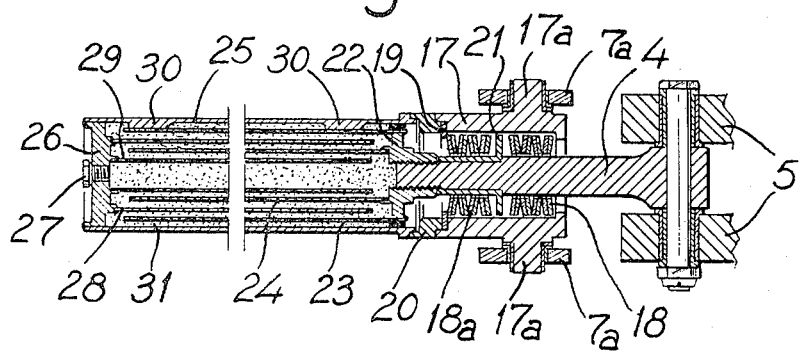
FIG. 4 shows in axial section along the line IV—IV of FIG. 2 a frequency adapter with dished washers to provide springiness and a shearable plastics film to provide damping.

Referring first to FIG. 1 to 5, the tie device shown thereon essentially includes a sliding damped elastic element 1 formed of a mechanism 2 acting as a spring and a linear damper 3. One of the sliding portions of element 1 is attached by means of a pin extending through the eye of a rod 4 to a clevis 5 formed on a sleeve 6 carried rotatably on a hub arm 6a of a helicopter rotor, the other slidable portion of element 1 being pivotally connected by journal bearings 7 to a clevis 7a extending from a metal cap 8 formed of two half-shells bolted together at 9 about a blade root 10 whereby to be rigidly united therewith.

Blade 10 is formed with an eye at its root end and is connected to the end of sleeve 6, formed as a clevis 6b, by a pin 11 in such manner as to allow the blade to pivot through a few degrees in its plane of rotation. To this end thin self-lubricating bushes 12 are interposed between pin 11 and the assembly comprising cap 8 and blade root 10, which assembly is further provided with a hard steel bushing 13 by way of reinforcement. In addition, likewise self-lubricating thin washers 14 are carried on pin 11 between cap 8 and the inner surfaces of the clevis flanges 6b. The bores in flanges 6b are lined with rimmed hard steel bushings 15 through which pin 11 is just able to slide, being retained at one end by a head and at the other by a securing nut 16.

In spite of the high centrifugal leading produced by the blade on such a tie system, this simplified arrangement requiring no servicing lubrication is made feasible by the small angular travel of the two mutually displaceable elements, which remains less than 1° at cruise RPM and under 3° under transient resonant conditions, so that the product of the contact pressure of the pin times the rate of angular motion of the latter within the self-lubricating bushes remains well below the permissible limits for the materials of which the bushes are made and thus ensures that the latter have a virtually unlimited service life.

Upstanding form sleeve 6 is a blade pitch varying lever 6a designed to be connected to a link forming part of the helicopter controls (not shown).

Referring next to FIG. 4, the sliding damped elastic tie 1 is formed by a housing 17 formed with two lateral journals 17a which perform the same function as the aforesaid journals 7, and these journals 17a cooperate with two lined bores formed in the flanges of clevis 7a.

Housing 17 accommodates two stacks of dished spring washers 18 and 18a which at one end bear longitudinally against a rim formed on the end of housing 17 and at the other against a washer 19 inserted into a bore formed in housing 17 and retained by a spacer element 20.

The rod 4 which extends through housing 17 and through the stacks of spring washers is associated to a flanged bush 21, the flange of which separates the two stacks 18 and 18a whereby to transmit to either one thereof the longitudinal movements of rod 4. In the particular embodiment illustrated, rod 4 may be considered to be immovable since it is coupled to sleeve 6 and it is the housing 17 forming part of damped and sliding tie system 1 that slides along it.

Screwed on to the end of rod 4 is a fitting 22 which retains flanged bush 21 and to which are welded the end-sections of two thin coaxial metal tubes 23 and 24.

Furthermore, housing 17 is extended by a tube 25 to the end of which is welded a cover 26 bearing a screw-plug 27. Welded to cover 26 are two further coaxial tubes 28 and 29, one of which extends into the interval between tubes 23 and 24 and the other into the interior of tube 24, these several tubes being uniformly gapped radially by a few millimetres.

Inside tube 25 and at the ends thereof are formed two sets of three regularly spaced protrusions 30 for guiding the tube 23.

All the available space inside tube 25 is filled with a viscoelastic material 31 having high degrees of static and dynamic damping that remain constant over a wide temperature range, as well as good endurance and resistance to creep and aging. This viscoelastic filling material 31 may be a polyurethane-based elastomer or a silicone-based adhesive putty having a preferably low shearing modulus G possibly included between 0.1 and 10 hb, in conjunction with great retentivity under deformation, that is to say that the work of deformation is accompanied by a likewise high proportion of energy transformed into heat, resulting in the generation of forces dependent on the rate of deformation and in dynamic damping of the motions in which said material partakes.

Filling is effected by mutually telescoping the sets of tubes after the same have been lined with the viscoelastic material. Venting tubes (not shown) are provided in the covers 22 and 26 in order to permit total filling and thereafter discharging of the surplus material when the tubes are telescoped. The holes are subsequently plugged by filling them with a self-polymerizing resin.

The annular space between the periphery of end fitting 22 and the inner surface of tube 25 is plugged by a flexible plastics seal which is fitted after the filling operation. The assembly comprising housing 17, spacer 20 and tube 25 is kept united by four screwed tie-rods, the ends of which are visible only in FIG. 3.

Figure 5:
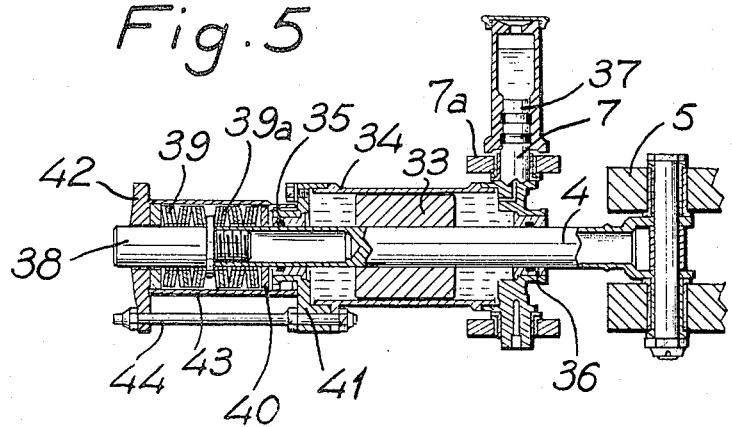
FIG. 5 is a sectional showing of an alternative embodiment to FIG. 4.

In the embodiment shown in FIG. 5, the damping system hereinbefore described is replaced by a hydraulic unit well known par se operating by throttling a fluid between a piston 33 rigid with rod 4 and the bore of a cylinder 34, suitable clearance being provided therebetween in order to produce the desired damping effect.

The ends of cylinder 34 are provided with leaktight bearings 35 and 36 and with a device 37 for automatically filling the cylinder 34, which device is well known per se and is not shown in detail and which is preferably mounted on one of the journals 7. Screwed on to the end of rod 4 is a flanged fitting 38, which flange has reacting thereagainst two stacks of dished spring washers 39 and 39a which are restrained at the inner end by a washer 40 bearing against the end 41 of hydraulic damper 34 and at the outer end by a cap 42 which is braced in position by a tubular spacer 43 enveloping said washers. Three tie-rods 44 secure the end fitting 41 of cylinder 34 to cap 42.

Figure 6:
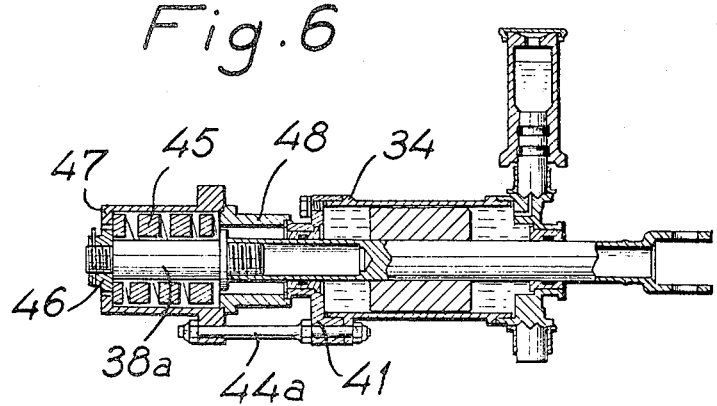
FIG. 6 is a sectional showing of another alternative embodiment.

Reference is next had to FIG. 6 for a showing of an elastic system formed by a very stiff coil spring 45, preferably of square section and housed between the flange of end-fitting 38a and a terminal nut 46 secured on to the end of fitting 38a. Spring 45 bears, at its outer end, against an end rim 47 formed on a cap restrained by tie-rods 44a, and at its inner end against a spacer 43 interposed between said cap and the end cover 41 of the hydraulic damper.

The cap 47 is rigidly connected to damper cylinder 34 and end cover 41 by means of three tie-rods 44a.

It will be appreciated that the dual reaction surfaces provided for the ends of spring 45 ensure that the system is double-acting.

Figure 7:
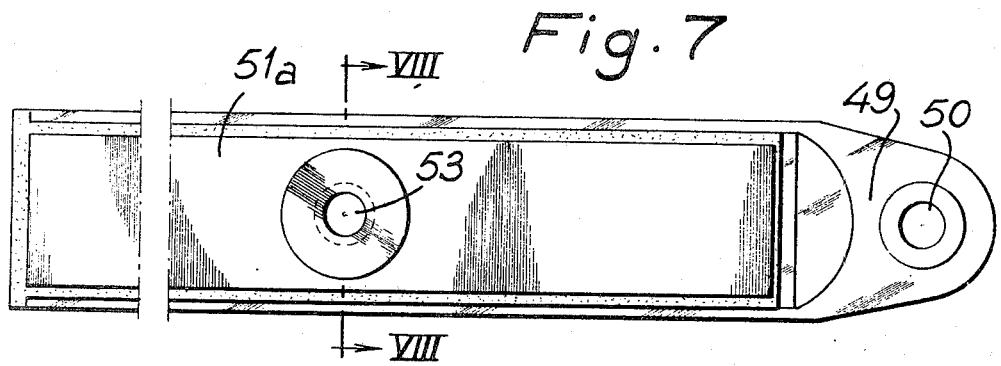
FIG. 7 is a plan view of yet another alternative embodiment functioning by distortion of a viscoelastic film.
Figure 8:
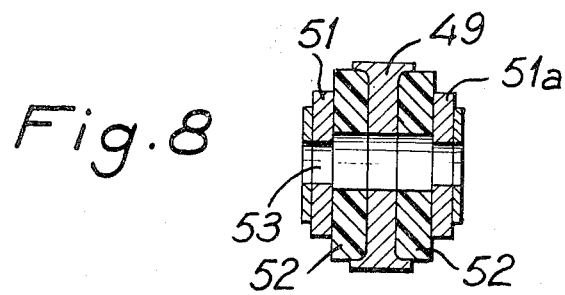
FIG. 8 is a section taken through the line VIII—VIII of FIG. 7.

FIGS. 7 and 8 depict yet another embodiment of a damped elastic system which is advantageous from the standpoint of weight and simplicity of manufacture and maintenance and which makes use of the special combined properties of low elasticity and great retentivity under deformation possessed by certain synthetic materials belonging to the elastomer family. This embodiment includes a metallic central member 49 preferably made of aluminium alloy, which in plan view is shaped as a rectangle of high aspect ratio and which in cross-section is of I-shape. One end of member 49 is formed with an eye 50 in order to enable it to be pinned to clevis 5.

Positioned on either side of central plate 49, approximately one centimetre therefrom and parallel thereto, are two side plates 51 and 51a.

The space between central plate 49 and each of side plates 51 and 51a is filled with strips 52 of a viscoelastic material which are retained longitudinally by the flanges of I-plate 49.

This elastomer material possesses, over a wide temperature range, properties of elasticity and retentivity under deformation such that the ratio $G'/G''$ of the moduli characterizing stiffness and damping, respectively, are in the region of three, the true dynamic shearing modulus $G'$ and the imaginary damping modulus $G''$ being determined by the following expressions, which take into account the lag between the force F introduced into the material and the resulting movement $d$:

$$G' = \frac{F}{d}\cos\phi$$

$$\text{and } G'' = \frac{F}{d}\sin\phi$$

Said strips are united with the central plate 49 and the side plates 51 and 51a by gluing or preferably vulcanizing them thereto.

The two side plates 51 and 51a are formed substantially in their middles with a hole 53 for passage therethrough of a pin (not shown) for securing the device into clevis 7a, but the central plate 49 and the viscoelastic strips 52 are formed with holes which are of greater diameter than hole 53 and coaxial therewith, whereby to permit relative motion between the various elements.

It will be appreciated that by way of an alternative embodiment (not shown), plates 51 and 51a and central plate 49 could be replaced by coaxial tubular elements, but it is to be noted that in that event the gluing or vulcanizing of the viscoelastic material will be harder to carry out and control.

Figure 9:
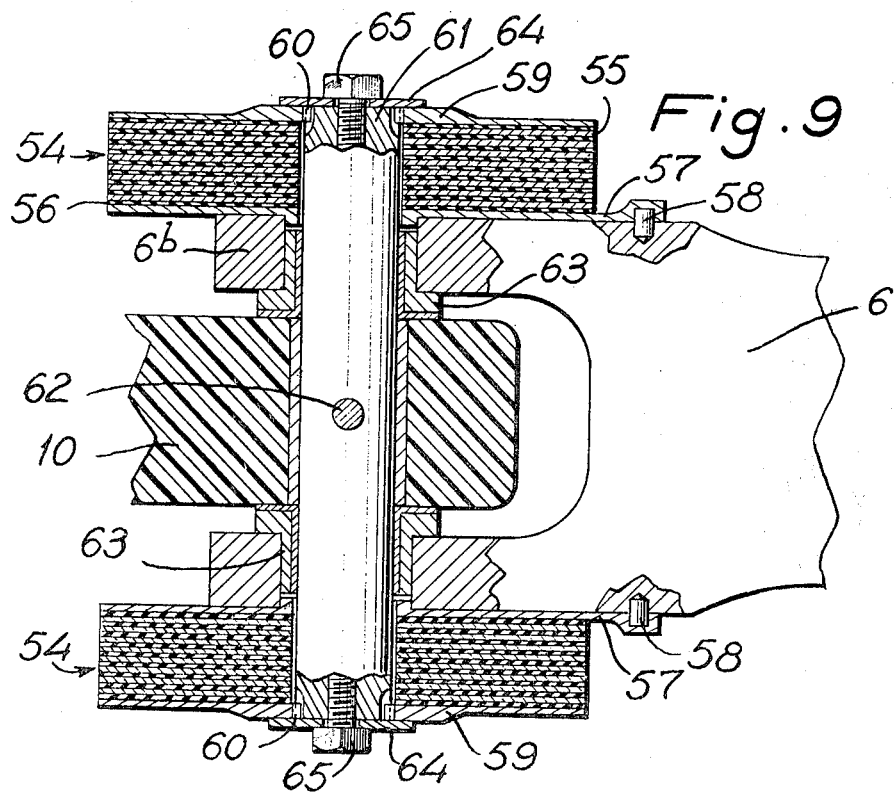
FIG. 9 is a sectional showing of an alternative embodiment, acting directly in rotation.

The embodiment depicted in FIG. 9 likewise enables use to be made of the elasticity and retentivity properties of such a viscoelastic material, but in this alternative arrangement two stacks (generally designated by 54) of a plurality of circular metal discs 55, between which are glued or vulcanized thin strips 56 of said material, perform the functions of elastic restoration and damping. The innermost discs 57 of the two stacks each have their outer sides applied against the respective flanges of clevis 6b and are rigidly united therewith by a dowel 58. The outermost disc 59 of each stack is thicker in its central region and formed with splines 60, whereby it is made angularly rigid with the corresponding matchingly splined end of pin 61.

Pin 61 extends through blade-root eye 10 and is made rigid therewith by linchpin 62. Pin 61 is supported in the clevis flanges 6b of the blade-supporting hub member by self-lubricating flanged bushes 63.

A washer 64 retained by a bolt 65 restrains the stacks 54 axially.

As blade-root 10 and blade-supporting hub member 6 rotate relative to each other, the discs 55 of stacks 54 move with mutual offset and impose upon the strips 56 of viscoelastic material interposed therebetween a shearing effect that generates the required restoring and damping effect.

It goes without saying that changes and substitutions may be made to the specific embodiments hereinbefore described without departing from the scope of the invention.

What I claim is:

1. In a damped elastic tie device located directly between a flexible blade and rigid hub on a rotor craft rotor and forming a frequency adapter with incorporated damping, attachment means at each blade root directly and hingedly connecting the latter and said hub with a limited degree of freedom only in the plane of rotation of said blade, said attachment means comprising a portion fast with the blade and a portion fast with the hub, and interconnection means between that portion which is fast with the blade and that portion which is fast with the hub, a damping element having a high damping rate and an elastic element whose stiffness varies proportionally to the extent of movement to either side of a neutral point, said damping element and elastic elastic element being constituted by parallel plates arranged in two sets, one of which is fast with one portion of said attachment means and the other with a second portion thereof, layers of synthetic viscoelastic material of an elastomer of great stiffness and high retentivity in respect of deformation, said plates being joined by said layers interposed therebetween.

2. In a device as claimed in claim 1, said interconnection means therefor formed of a plurality of parallel plates joined by interposed layers of a viscoelastic material having great stiffness and high retentivity in respect of deformation, each stack of parallel plates having one of its end plates fast with one of the portions of said attachment means and its other end plate fast with the other portion of said attachment means.

3. In a device as claimed in claim 1 wherein said viscoelastic material is vulcanized to said plates of the two sets.

4. In a device as claimed in claim 1 wherein said interconnection means comprises a pin joining said plates and layers of synthetic viscoelastic material, said pin being tightly fitted in the said one plate set and loosely fitted in said other plate set and in said layers of viscoelastic material.

5. In a device as claimed in claim 1 wherein said other plate set comprises a rectangular member having a crosssection of I-shape with said layers confined between the flanges of the I-shape member.

* * * * *